US011380335B2

(12) United States Patent
Netsch et al.

(10) Patent No.: US 11,380,335 B2
(45) Date of Patent: *Jul. 5, 2022

(54) METHOD AND SYSTEM FOR LOSSLESS VALUE-LOCATION ENCODING

(71) Applicant: TEXAS INSTRUMENTS INCORPORATED, Dallas, TX (US)

(72) Inventors: Lorin Paul Netsch, Allen, TX (US); Jacek Piotr Stachurski, Dallas, TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/690,536

(22) Filed: Nov. 21, 2019

(65) Prior Publication Data

US 2020/0090667 A1 Mar. 19, 2020

Related U.S. Application Data

(63) Continuation of application No. 15/018,524, filed on Feb. 8, 2016, now Pat. No. 10,510,351, which is a
(Continued)

(51) Int. Cl.
*G10L 19/00* (2013.01)
*G10L 19/24* (2013.01)
(Continued)

(52) U.S. Cl.
CPC ........ *G10L 19/0017* (2013.01); *G10L 19/008* (2013.01); *G10L 19/038* (2013.01);
(Continued)

(58) Field of Classification Search
CPC . G10L 19/0017; G10L 19/008; G10L 19/038; G10L 19/167; G10L 19/24; G10L 21/038; G11B 20/10527
See application file for complete search history.

(56) References Cited

U.S. PATENT DOCUMENTS 5,621,853 A   4/1997 Gardner
7,805,292 B2  9/2010 Huo et al.
(Continued)

OTHER PUBLICATIONS

"Lossless Compression of G.711 Pulse Code Modulation", ITU-T Telecommunication Standardization Sector of ITU, Series G: Transmission Systems and Media, Digital Systems and Networks, Digital terminal equipments—Coding of voice and audio signals, Recommendation ITU-T G.711.0, Sep. 2009, pp. 1-72.
(Continued)

*Primary Examiner* — Fariba Sirjani
(74) *Attorney, Agent, or Firm* — Brian D. Graham; Charles A. Brill; Frank D. Cimino

(57) ABSTRACT

A method of encoding samples in a digital signal is provided that includes receiving a frame of N samples of the digital signal, determining L possible distinct data values in the N samples, determining a reference data value in the L possible distinct data values and a coding order of L−1 remaining possible distinct data values, wherein each of the L−1 remaining possible distinct data values is mapped to a position in the coding order, decomposing the N samples into L−1 coding vectors based on the coding order, wherein each coding vector identifies the locations of one of the L−1 remaining possible distinct data values in the N samples, and encoding the L−1 coding vectors.

20 Claims, 5 Drawing Sheets

Related U.S. Application Data continuation of application No. 14/199,187, filed on Mar. 6, 2014, now Pat. No. 9,257,126, which is a continuation of application No. 12/818,165, filed on Jun. 18, 2010, now Pat. No. 8,700,410.

(60) Provisional application No. 61/219,868, filed on Jun. 24, 2009, provisional application No. 61/219,198, filed on Jun. 22, 2009, provisional application No. 61/218,307, filed on Jun. 18, 2009.

(51) Int. Cl.
| | | |
|---|---|---|
| *G10L 19/16* | (2013.01) | |
| *G11B 20/10* | (2006.01) | |
| *G10L 21/038* | (2013.01) | |
| *G10L 19/008* | (2013.01) | |
| *G10L 19/038* | (2013.01) | |

(52) U.S. Cl.
CPC ............ *G10L 19/167* (2013.01); *G10L 19/24* (2013.01); *G10L 21/038* (2013.01); *G11B 20/10527* (2013.01)

(56) References Cited

U.S. PATENT DOCUMENTS

| | | | | |
|---|---|---|---|---|
| 8,700,410 | B2 * | 4/2014 | Netsch | G10L 19/008 704/229 |
| 9,245,529 | B2 | 1/2016 | Stachurski et al. | |
| 9,257,126 | B2 * | 2/2016 | Netsch | G11B 20/10527 |
| 10,510,351 | B2 * | 12/2019 | Netsch | G10L 19/24 |
| 2003/0194017 | A1 | 10/2003 | Woodworth | |
| 2003/0231775 | A1 * | 12/2003 | Wark | G10L 15/04 381/56 |
| 2004/0120590 | A1 * | 6/2004 | Fuchs | H03M 7/3082 382/239 |
| 2004/0123222 | A1 * | 6/2004 | Widmer | H04L 25/4908 714/779 |
| 2005/0078021 | A1 | 4/2005 | Cohen et al. | |
| 2005/0114123 | A1 | 5/2005 | Lukac et al. | |
| 2005/0270288 | A1 | 12/2005 | Areas | |
| 2007/0055137 | A1 | 3/2007 | Feiweier | |
| 2008/0310507 | A1 * | 12/2008 | Ye | H04N 19/196 375/240.12 |
| 2009/0319263 | A1 | 12/2009 | Gupta et al. | |
| 2011/0116542 | A1 * | 5/2011 | Oger | H04N 19/184 375/240.03 |

OTHER PUBLICATIONS

Solomon W. Golomb, "Run-Length Encodings", IEEE Transactions on Information Theory, Jul. 1966, vol. 12, Issue 3, pp. 399-401.

Robert F. Rice, "Some Practical Universal Noiseless Coding Techniques", JPL Publication 79-22, Mar. 15, 1979, National Aeronautics and Space Administration, Pasadena, CA, pp. 1-130.

Jacek P. Stachurski, et al., "Method and System for Block Adaptive Fractional-Bit Per Sample Coding", U.S. Appl. No. 12/818,164, filed Jun. 18, 2010, pp. 1-24.

* cited by examiner

METHOD AND SYSTEM FOR LOSSLESS VALUE-LOCATION ENCODING

CROSS-REFERENCE TO RELATED APPLICATIONS

This application is a continuation of U.S. patent application Ser. No. 15/018,524, filed Feb. 8, 2016, which is a continuation of U.S. patent application Ser. No. 14/199,187, filed Mar. 6, 2014, now U.S. Pat. No. 9,257,126, which is a continuation of U.S. patent application Ser. No. 12/818,165, filed Jun. 18, 2010, now U.S. Pat. No. 8,700,410, which claims priority to U.S. Provisional Patent Application No. 61/218,307, filed Jun. 18, 2009, U.S. Provisional Patent Application No. 61/219,198, filed Jun. 22, 2009, and U.S. Provisional Patent Application No. 61/219,868, filed Jun. 24, 2009, all of which are incorporated herein by reference in their entirety.

BACKGROUND OF THE INVENTION

In many signal processing applications, it is desirable to transmit and/or store a digitized signal such that the exact original signal may be recovered. It is also desirable to reduce the number of bits needed to represent the signal in order to maximize the amount of data than can be handled during the transmission and/or storage process. Lossless compression techniques may be used to achieve this goal. Many techniques exist for lossless compression including Huffman coding, run-length coding, and predictive coding. Each of these coding techniques may provide comparatively better compression for certain classes of signals. However, improvements in lossless compression of digital signals are desirable.

Further, in many cases, digital signals to be encoded and transmitted include one predominant sample value, with sparse excursions to a few other sample values. For example, background noise in digital audio signals will often have a few distinct sample values. Signals with this sample characteristic are often not conducive to efficient encoding by known encoding techniques, such as linear predictive coding. When data to be transmitted includes predominantly one sample value, with sparse excursions to a single additional sample value, a run-length coding technique may be used. However, if sparse excursions occur to more than one other value, the typical run-length coding techniques may not be efficient, since such techniques may be most effective in encoding digital signals having sequences of one predominant sample value with a single other sample value sparsely included.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
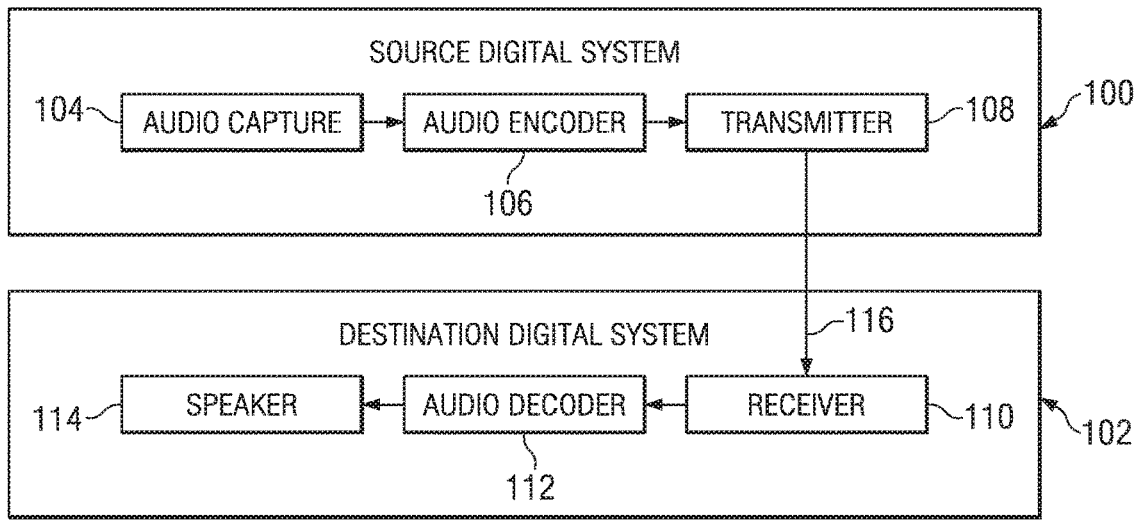
FIG. 1 shows a block diagram of a digital system in accordance with one or more embodiments of the invention.

Specific embodiments of the invention will now be described in detail with reference to the accompanying figures. Like elements in the various figures are denoted by like reference numerals for consistency.

Certain terms are used throughout the following description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. In addition, although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein. Further, while some embodiments of the invention are described herein in reference to the ITU-T G.711.0 standard and/or audio signals, one of ordinary skill in the art will understand that embodiments of the invention are not limited to any particular signal coding standard or type of signal. Recommendation ITU-T G.711.0 ("ITU-T G.711.0") as approved on Sep. 22, 2009 by ITU-T Study Group 16 is incorporated by reference herein in its entirety.

In general, embodiments of the invention provide for lossless value-location encoding of a digital signal in which the locations of occurrences of each possible distinct sample value in the digital signal are encoded. More specifically, in one or more embodiments of the invention, a frame of N samples with L possible distinct data values is decomposed into L−1 coding vectors where each coding vector represents the locations of one of L−1 of the possible distinct data values in the frame. The decomposition is performed by determining a reference data value in the L possible distinct data values, determining a coding order of the L−1 remaining possible distinct data values, and generating the L−1 coding vectors according to the coding order. Each of the coding vectors is then encoded in the order of generation and inserted into the output bit stream. Indicator(s) of the reference data value and the coding order may also be encoded and inserted in the output bit stream.

FIG. 1 shows a block diagram of a digital system in accordance with one or more embodiments of the invention. The digital system is configured to perform coding of digital audio sequences using embodiments of the methods described herein. The system includes a source digital system (100) that transmits encoded digital audio sequences to a destination digital system (102) via a communication channel (116). The source digital system (100) includes an audio capture component (104), an audio encoder component (106) and a transmitter component (108). The audio capture component (104) is configured to provide an audio sequence to be encoded by the audio encoder component (106). The audio capture component (104) may be, for example, a microphone, a speech synthesizer, an audio archive, or an audio feed from an audio content provider.

The audio encoder component (106) receives an audio sequence from the audio capture component (104) and encodes it for transmission by the transmitter component (108). In general, the audio encoder component (106) receives the audio sequence from the audio capture component (104) as a sequence of frames and encodes the audio data in each frame for transmission. During the encoding process, a method for lossless value-location encoding in accordance with one or more of the embodiments described herein may be used. The functionality of an embodiment of the audio encoder component (106) is described in more detail below in reference to FIG. 5.

The transmitter component (108) transmits the encoded audio data to the destination digital system (102) via the communication channel (116). The communication channel (116) may be any communication medium, or combination of communication media suitable for transmission of the encoded audio sequence, such as, for example, wired or wireless communication media, a local area network, and/or a wide area network.

The destination digital system (102) includes a receiver component (110), an audio decoder component (112) and a speaker component (114). The receiver component (110) receives the encoded audio data from the source digital system (100) via the communication channel (116) and provides the encoded audio data to the audio decoder component (112) for decoding. In general, the audio decoder component (112) reverses the encoding process performed by the audio encoder component (106) to reconstruct the frames of the audio sequence. The reconstructed audio sequence may then be reproduced by the speaker component (114). The speaker component (114) may be any suitable audio reproduction device.

In some embodiments of the invention, the source digital system (100) may also include a receiver component and an audio decoder component and/or the destination digital system (102) may include a transmitter component and an audio encoder component for transmission of audio sequences in both directions. Further, the audio encoder component (106) and the audio decoder component (112) may perform encoding and decoding in accordance with one or more audio compression standards such as, for example, ITU-T G.711 and G.711.0 standards. The audio encoder component (106) and the audio decoder component (112) may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc. Software implementing all or part of the audio encoder and/or audio decoder may be stored in a memory, e.g., internal and/or external ROM and/or RAM, and executed by a suitable instruction execution system, e.g., a microprocessor or DSP. Analog-to-digital converters and digital-to-analog converters may provide coupling to the real world, modulators and demodulators (plus antennas for air interfaces) may provide coupling for transmission waveforms, and packetizers may be included to provide formats for transmission.

Figure 2:
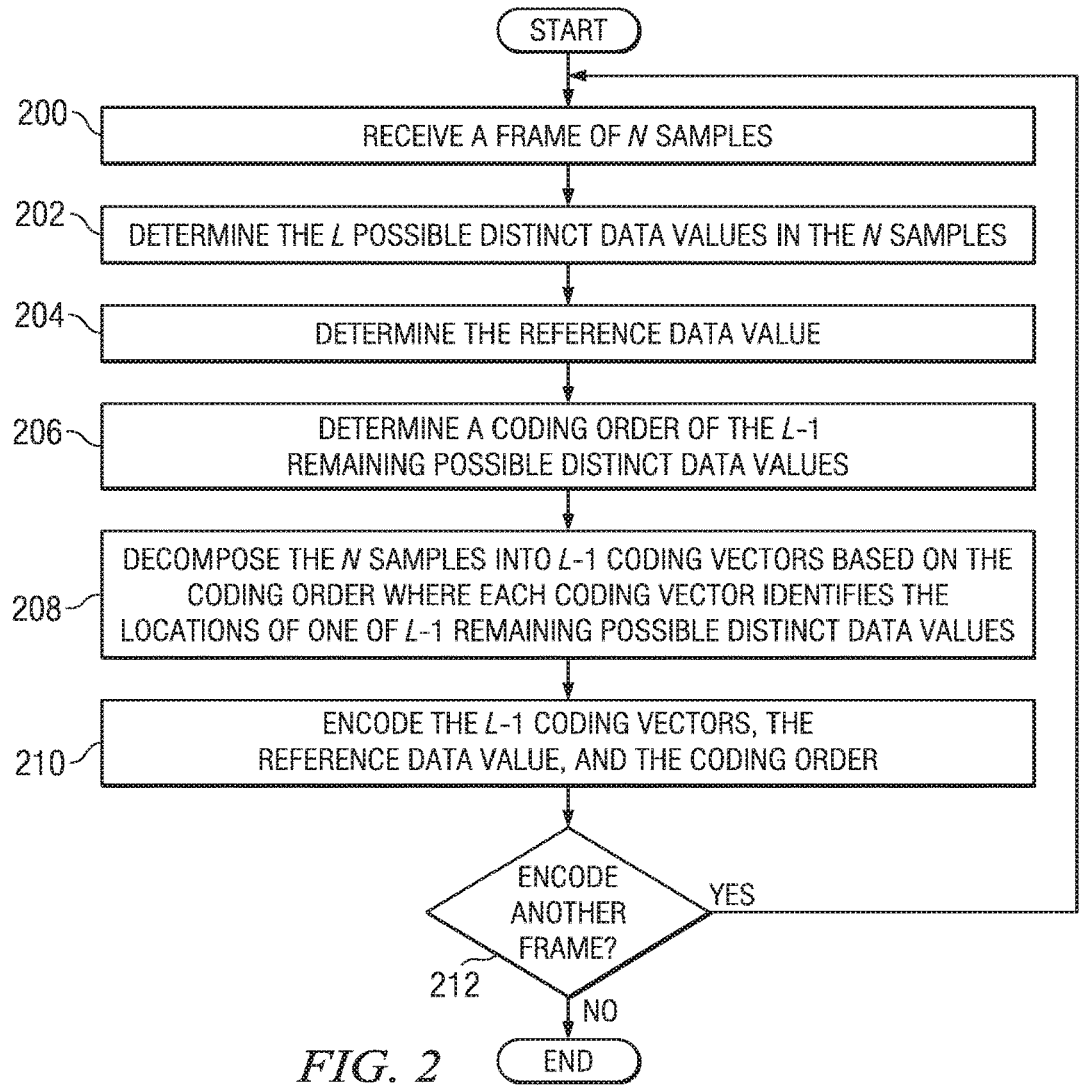
FIG. 2 shows a flow diagram of a method in accordance with one or more embodiments of the invention.

FIG. 2 shows a flow diagram of a method for lossless value-location coding of one or more frames of N samples in a digital signal in accordance with one or more embodiments of the invention. As shown in FIG. 2, initially, a frame of N samples, $I_0$ to $I_{N-1}$, of the digital signal is received (200). The value of N may be any suitable value. For example, N may be 40, 80, 160, 240, or 320.

Next, the L possible distinct data values that the N samples may be determined (202). The possible distinct data values in the N samples may be determined by finding the maximum sample value $I_{max}=\max\{I_n:n=0,\ldots N-1\}$ and the minimum sample value $I_{min}=\min\{I_n:n=0,\ldots N-1\}$ in the N samples. The possible distinct data values $\{i_l:l=0,\ldots,L-1\}$ are then the range of data values from $I_{min}$ to $I_{max}$, i.e., $I_{min} \leq i_l \leq I_{max}$. The number of possible distinct data values L, i.e., the data value range, for the frame may be computed as the difference between the maximum and minimum values of the N samples in the frame, e.g., $L=I_{max}-I_{min}+1$. For example, if the actual distinct sample values in the frame are $\{-3, -2, 0, 1, 2\}$, then L=6, indicating that there are six possible distinct data values in the frame and the possible distinct data values are $\{-3, -2, -1, 0, 1, 2, 3\}$.

A reference data value $v_0$ is then determined from the possible distinct data values $i_l$ (204) and a coding order $\{v_k: k=1, \ldots, L-1\}$ of the L-1 remaining possible distinct data values is also determined (206). As is explained in more detail below, the reference data value $v_0$ and the coding order impact the decomposition of the N samples into coding vectors, and thus the overall coding efficiency. That is, the coding vectors, each of which represents locations of one of the L-1 remaining possible distinct data values in the N samples, are generated according to the coding order and this coding order may affect the content and length of the coding vectors. Further, as is explained in more detail below, the reference data value and coding order, unless fixed for all frames, are encoded in some fashion for communication to the decoder. The selection of the reference data value and the coding order affect how many bits are required for encoding.

The reference data value $v_0$ may be any one of the possible distinct data values $i_l$ and may be determined in any suitable way, e.g., a single empirically determined value, direct computation, table look-up, etc. For example, the reference data value $v_0$ may be the data value that occurs most frequently in the N samples, or, if the digital signal has certain characteristics, may be set to 0 for all frames. The coding order $\{v_k:k=1,\ldots,L-1\}$ of the L-1 remaining possible distinct data values may be also be determined in any suitable way. In general, the L-1 remaining possible distinct data values are mapped in some way to one of the $v_k$. For example, if the possible distinct data values are $\{-2,-1,0,1,2\}$ and the reference data value $v_0=0$, one possible coding order is $\{-1,1,-2,2\}$. The technique(s) for determining the reference data value $v_0$ and the coding order $v_k$ may be defined by a particular application, resources available, known signal characteristics, and/or performance required. Factors to be considered in the determination of the reference data value $v_0$ and the coding order $v_k$ are discussed below.

One possible way to determine the reference data value $v_0$ and/or the coding order $v_k$ is to calculate the compression obtained for each possible reference data value and/or coding order of the L−1 remaining possible data values and the corresponding coding vectors, and choose a reference data value and/or the coding order that provides the best compression. However, this requires computational resources that may not be available. In addition, this would require explicit encoding of the coding order. Another possible way to determine the reference data value $v_0$ and the coding order is to select the reference data value in some suitable way and then use a specific pre-determined coding order, for example from the minimum to the maximum data value of the remaining possible data values. This does not require the computational resources mentioned above, and does not require explicitly encoding the coding order. However, this approach may not provide the best overall compression performance. Another possible way to determine the reference data value $v_0$ and the coding order is to select the most frequently occurring data value in the N samples as the reference data value and to order the L−1 remaining possible data values in order of frequency of occurrence. This also does not require the computational resources of the initial approach but it does require explicitly encoding the reference data value and the coding order. Again, this approach may not provide the best overall compression performance.

In some embodiments of the invention, the reference data value $v_0$ is set to the data value that occurs most often in the N samples. The coding order $v_k$ of the L−1 remaining possible distinct data values is determined by comparing the total number of occurrences of actual distinct data values in the N samples above the reference value $v_0$, $N_A$, to the total number of occurrences of values below the reference value $v_0$, $N_B$. The L−1 possible distinct data values are mapped to the coding order $v_k$ by alternating above and below the reference data value $v_0$ as follows:

| if $N_A \geq N_B$ | if $N_A < N_B$ |
|---|---|
| $v_1 = v_0 + 1$ | $v_1 = v_0 - 1$ |
| $v_2 = v_0 - 1$ | $v_2 = v_0 + 1$ |
| $v_3 = v_0 + 2$ | $v_3 = v_0 - 2$ |
| $v_4 = v_0 - 2$ | $v_4 = v_0 + 2$ |
| ⋮ | ⋮ |

Assignment above and below the reference value $v_0$ is done as long as data values are available for alternating; any remaining data values are then assigned to the remaining $v_k$.

Figure 3A:
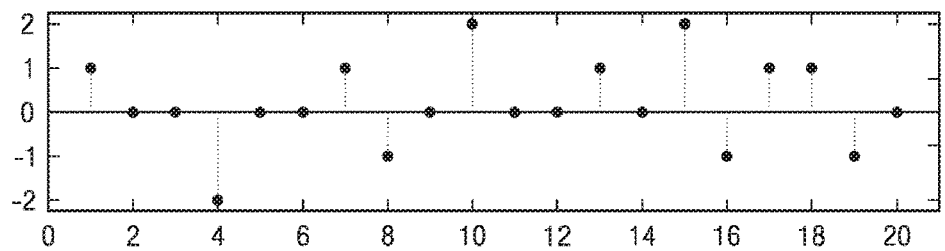
FIGS. 3A-3E and 4A-4D show examples in accordance with one or more embodiments of the invention.
Figure 3B:
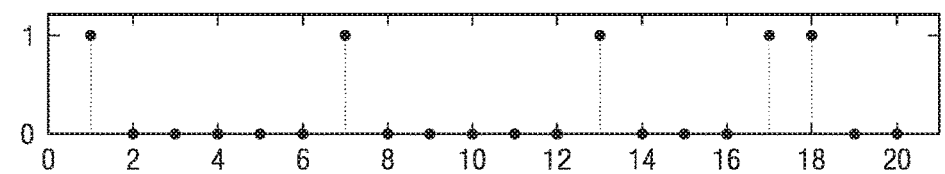

For example, consider the example signal of FIG. 3A. In this signal, N=20, L=5, and the possible distinct data values are {−2,−1,0,1,2}. The most frequently occurring data value is 0, so the reference data value $v_0$ is set to 0. Further, $N_A$=7 and $N_B$=4. Since $N_A > N_B$, the coding order will be {1,−1,2,−2}. If this approach for determining the reference data value $v_0$ and the coding order $v_k$ is used, the information to be encoded for the decoder is the reference data value $v_0$ and an indication of whether the first data value in the coding order is the data value above or below the reference data value $v_0$, e.g., a single bit.

Referring again to FIG. 2, once the reference data value $v_0$ and the coding order are determined, the N samples are decomposed into L−1 coding vectors based on the coding order where each coding vector identifies the locations of one of the L−1 remaining possible data values, i.e., the locations of one of the $v_k$, in the N samples (208). In some embodiments of the invention, the N samples are first decomposed into L−1 interim coding vectors $c_k$ with a 1 at locations where the respective $v_k$ value occurs and a 0 in all other locations. The interim coding vectors $c_k$ are then processed to generate reduced-length coding vectors $z_k$.

More specifically, the N samples, denoted as s, may be decomposed as $$s = v_0 + \sum_{k=1}^{L-1} (v_k - v_0) c_k$$

where the interim coding vectors $c_k$ represent the locations of all values $v_k$ within the N samples. An interim coding vector $c_k$ contains 1 at the locations at which the value $v_k$ occurs, and 0 elsewhere. The number of occurrences of each $v_k$ value, $N_k$, equals the number of non-zero elements in the corresponding $c_k$ vector, $$N_k = \sum_{i=1}^{N} c_k(i), \text{ with}$$

$$N_0 = N - \sum_{k=1}^{L-1} N_k.$$

To encode the N samples, it is sufficient to specify the number of possible data values L, the reference data value $v_0$, and the coding order $v_k$ with the corresponding interim coding vectors $c_k$.

FIGS. 3A-3E show an example of a digital signal decomposition into interim coding vectors $c_k$. In the original digital signal of FIG. 3A, N=20, L=5, and the possible distinct data values are {−2,−1,0,1,2}. For the decomposition, the reference value $v_0$=0, and the coding order is $v_1$=1, $v_2$=−1, $v_3$=2, and $v_4$=−2. The corresponding interim coding vectors $c_k$ are shown in FIGS. 3B-3E.

The interim coding vectors $c_k$ are then reduced in length to generate the coding vectors $z_k$. The approach to generating the coding vectors $z_k$ takes advantage of the fact that the interim coding vectors $c_k$ contain non-zero elements in unique locations, i.e., if $c_k(n)=1$
then $c_l(n)=0$ for all $l \neq k$ where n=1, ..., N. Using this property, once a given interim coding vector $c_k$ is reduced to a coding vector $z_k$, the elements corresponding to the $N_k$ non-zero $c_k$ locations need not be considered when reducing all subsequent interim encoding vectors $c_i$, i>k.

The coding vectors $z_k$ may be generated from the interim coding vectors $c_k$ as follows. Let $z_k$ denote a vector obtained from the code vector $c_k$ by removing elements corresponding to all non-zero-value locations in vectors $c_1, \ldots, c_{k-1}$ (or, equivalently, by preserving those elements corresponding to zero-value locations). The $D_k$ dimension (length) of a vector $z_k$ is given by $$D_k = N - \sum_{i=1}^{k-1} N_i, k = 2, \ldots, L-1.$$

Let vectors $\delta_k$ specify the non-zero-value and zero-value locations observed in the interim coding vectors $c_1, \ldots, c_k$, $$\delta_k(n) = \sum_{i=1}^{k} c_i(n), k = 1, \ldots, L-1.$$

Note that the vectors $\delta_k$ may be calculated recursively:

$$\delta_1(n) = c_1(n)$$

$$\delta_k(n) = \delta_{k-1}(n) + c_k(n), k = 2, \ldots, L-1.$$

Further, let $$z_1(n) = c_1(n), n = 1, \ldots, N,$$

with the $D_1$ dimension equal to N. The coding vectors $z_k$, $k=2, \ldots, L-1$, may be computed as follows:
set m=1
for each n=1, ..., N
  if $\delta_{k-1}(n) = 0$
  then $z_k(m) = c_k(n)$ and m=m+1
Note that the coding vectors $z_k$, $k=2, \ldots, L-1$ are generated sequentially in the coding order. The resulting coding vectors $z_k$ are summarized in Table 1 below.

TABLE 1

| Coding vector | Number of elements | Description |
| --- | --- | --- |
| $z_1$ | N | equivalent to $c_1$ |
| $z_2$ | $N - N_1$ | $c_2$ with elements corresponding to non-zero locations in $c_1$ removed |
| $z_3$ | $N - N_1 - N_2$ | $c_3$ with elements corresponding to non-zero locations in $c_1$ and $c_2$ removed |
| . | | |
| . | | |
| . | | |
| $z_{L-1}$ | $N - \sum_{i=1}^{L-2} N_i$ | $c_{L-1}$ with elements corresponding to non-zero locations in $c_1, \ldots, c_{L-2}$ removed |

Note that as elements are removed from the interim coding vectors $c_k$, the coding vectors become shorter with each processing step k which helps to improve coding efficiency. While the total number of elements in the interim coding vectors $c_k$ equals $N(L-1)$, the total number of elements in coding vectors $z_k$ is reduced to $$\sum_{k=1}^{L-1}\left(N - \sum_{i=1}^{k-1} N_i\right) = N(L-1) - \sum_{k=1}^{L-2}\sum_{i=1}^{k} N_i,$$

i.e., reduced by $$\sum_{k=1}^{L-2}\sum_{i=1}^{k} N_i = \sum_{k=1}^{L-2} N_k(L-1-k)$$

which is maximized when $N_1 \geq N_2 \geq \ldots \geq N_{L-1}$.

Figure 3C:
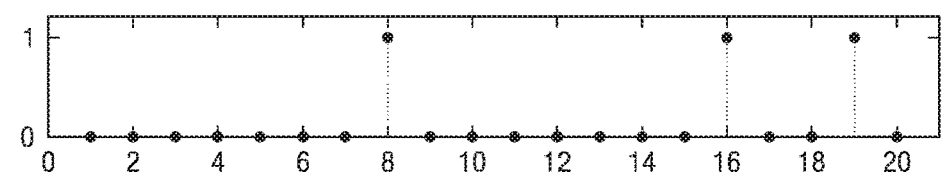
Figure 3D:
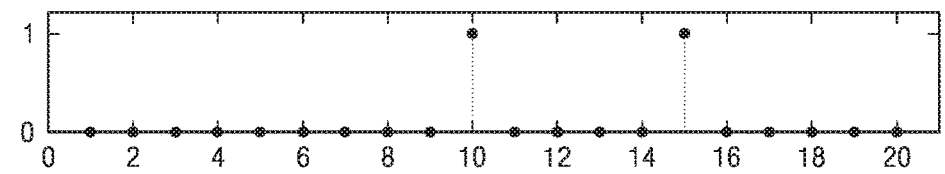
Figure 3E:
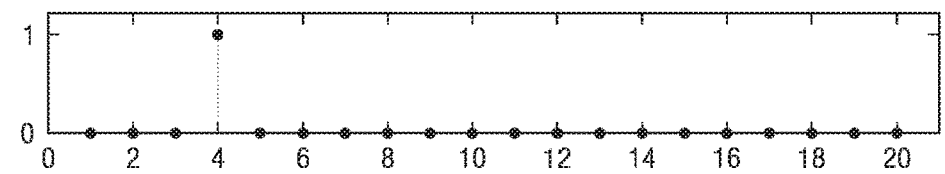
Figure 4A:
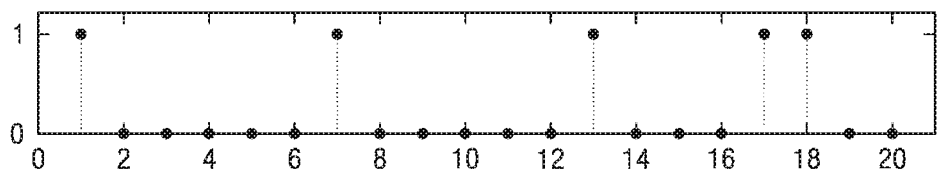
Figure 4B:
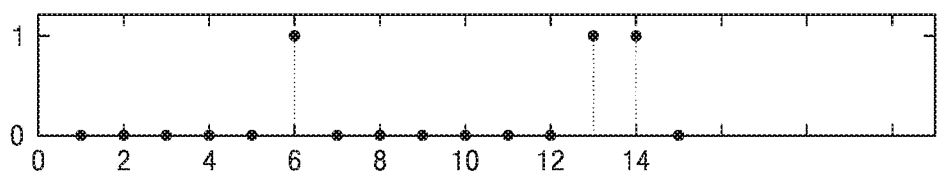
Figure 4C:
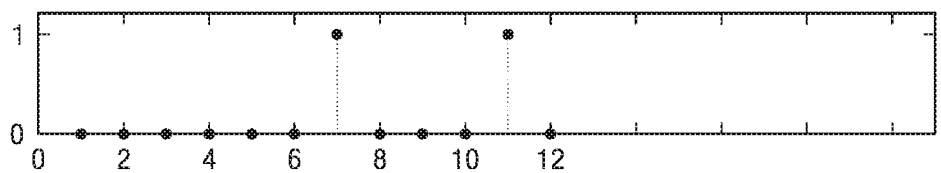
Figure 4D:
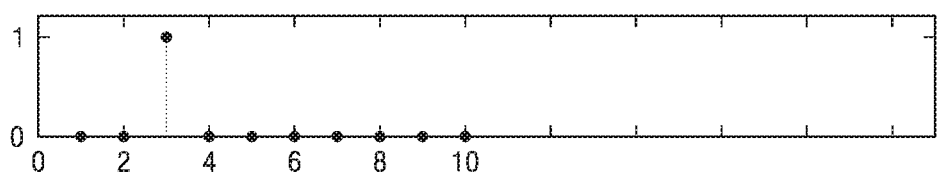

FIGS. 4A-4D show an example of the generation of the L–1 reduced-length coding vectors $z_k$ from the interim coding vectors $c_k$ of FIGS. 3B-3E. The $z_1$ coding vector of FIG. 4A is equivalent to the interim coding vector $c_1$ in FIG. 3B. The reduced-length coding vector $z_2$ of FIG. 4B is formed by removing the five non-zero locations in $c_1$ from the interim coding vector $c_2$ of FIG. 3C. The reduced-length vector $z_3$ of FIG. 4C is then formed by removing the eight non-zero locations in $c_1$ and $c_2$ from $c_3$ in FIG. 3D. This process continues until all L–1 reduced-length coding vectors are generated. As such, due to the removal of non-zero elements in prior vectors, vectors z1 through z4 as shown in FIG. 4A-D may be decreasing in number of locations. Vectors z1 through z4 also may have the locations renumbered so that they all start at 1 and are sequential. Vector z1 may contain 20 locations. Vector c1, of FIG. 3B, may contain five non-zero values, for example, at locations 1, 7, 13, 17, and 18. Therefore, in such an embodiment, vector z2 will contain 15 locations (i.e. locations 20–5). In one embodiment, Vector z2 is formed by removing locations 1, 7, 13, 17, and 18 from c2, as shown in FIG. 3C. Thus, the reduced vector z2, shown in FIG. 4B, may consist of fifteen locations, i.e. 2-6, 8-12, 14-16, and 19-20 of vector c2. These locations may be renumbered such that vector z2 has locations 1-15. To form vector z3, shown FIG. 4C, the non-zero locations of vectors c1 and c2 may be removed from vector c3, of FIG. 3D. Since vector c1 may have five non-zero values at locations, i.e. 1, 7, 13, 17, and 18, and since vector c2 may have three non-zero values at, i.e. 8, 16, and 19, there will be eight (5+3) locations removed, and vector z3 of FIG. 4C may have twelve (20–8) locations, consisting of the remaining locations, i.e. 2-6, 9-12, 14-15, and 20. Vector z3 may be formed by selecting those remaining locations from vector c3, and renumbering the locations. In such an embodiment, vector z3 would have locations 1-12. Vector z4 of FIG. 4D may be formed by removing the non-zero locations of vectors c1, c2, and c3 from vector c4 of FIG. 3E. As such, vector c1 may have five non-zero values at locations, i.e. 1, 7, 13, 17, and 18, and since vector c2 may have three non-zero values at, i.e. 8, 16, and 19, and since vector c3 may have two non-zero values at locations, i.e. 10 and 15, there will be 10 (5+3+2) locations removed and vector z4 of FIG. 4D may have ten (20–10) locations, consisting of the remaining locations, i.e. 2-6, 9, 11-12, 14, and 20. Vector z4 may be formed by selection the remaining locations from vector c4 of FIG. 3E and renumbering the locations to 1-10.

Referring again to FIG. 2, in some embodiments of the invention, as an alternative to calculating interim coding vectors $c_k$ and the coding vectors $z_k$, the vector of the N samples is directly decomposed into reduced-length coding vectors $s_k$ computed as follows. Let $s_1 = s$; the reduced-length coding vectors $s_k$, $k=2, \ldots, L-1$, may be computed as follows:
set m=1
for each n=1, ..., $D_{k-1}$
  if $s_{k-1}(n) \neq v_{k-1}$
  then $s_k(m) = s_{k-1}(n)$ and m=m+1
Note that the reduced-length coding vectors $z_k$ and the reduced-length coding vectors $s_k$ have the same length, $D_k$, and that the locations in the coding vectors $z_k$ which contain 1 are the locations in the coding vectors $s_k$ which contain $v_k$. Thus, encoding the locations of the $v_k$ values in the coding vectors $s_k$ is equivalent to encoding the locations of 1's in the coding vectors $z_k$.

The resulting coding vectors, i.e., the coding vectors $z_k$ or the coding vectors $s_k$ are then encoded along with an appropriate indication of the reference data value $v_0$ and the coding order used in generating the coding vectors (210) and inserted into the output bit stream. Any suitable encoding technique may be used to encode the coding vectors. Further, an encoding technique may be selected for each coding vector. That is, several encoding techniques may be available for use and the encoding technique that provides the best compression for a particular coding vector may be selected for that coding vector. For example, the coding vectors $z_k$ contain a series of zeros and ones, and there are many known techniques for encoding such vectors, such as run-length coding methods like Golomb or Rice encoding. However, for a particular coding vector $z_k$, run-length coding may not be optimum. When the number of non-zero elements $N_k$ is small, explicit encoding of the $N_k$ locations may result in a fewer number of bits. In this encoding technique, the number of non-zero locations $N_k$ and the locations themselves may be encoded using binary representation or other known pulse-coding techniques. In other cases, $N_k$ may be such that encoding $z_k(n)$ as binary bits may be more efficient than either run-length or explicit location encoding. Accordingly, the technique(s) used to encode the coding vectors $z_k$ may be defined by a particular application, resources available, signal characteristics and performance required.

In some embodiments of the invention, three encoding techniques are provided to be selected for encoding the coding vectors $z_k$, Rice run-length encoding, explicit location encoding, and binary encoding. Further, whenever for some k there are no occurrences of a particular value $v_k$, an indicator of a zero vector, $z_k=0$, is encoded in the output bit stream. The Rice run-length method encodes the length of segments between the occurrences of ones in a coding vector $z_k$ (which in essence defines the locations of all occurrences of a value $v_k$). Compression is maximized by determining the Rice exponent for each $z_k$ to be encoded. The Rice exponent is the power of two used in the Rice run-length encoding technique. In one or more embodiments, a search for the best exponent in the range of one to four is performed, and the exponent that provides the best compression is selected. The selected Rice exponent is encoded in the bit stream followed by the run-length encoding of the coding vector $z_k$.

Explicit location encoding may be used to improve compression when the number of non-zero elements $N_k$ in a coding vector $z_k$ is small. In this case, compression may be achieved by a straightforward encoding of a location offset within the coding vector. In one or more embodiments, if $N_k \leq 4$, explicit location encoding is used. In this case, the number of locations $N_k$ is encoded in the output bit stream followed by the offsets of each of the locations. Since the length of a coding vector $z_k$ is $D_k$, binary encoding of each location may be done in $\lceil \log_2(D_k) \rceil$ bits. In some embodiments of the invention, if the number of bits needed to run length encode a coding vector $z_k$ is greater than $D_k$, binary encoding is used. The binary coding technique writes the $D_k$ bits of the coding vector $z_k$ into the output bit stream. For each of these encoding techniques, an identifier of the selected encoding technique is also inserted in the output bit stream prior to the encoding bits of the coding vector $z_k$.

In some embodiments of the invention, three encoding techniques are provided to be selected for encoding the coding vectors $s_k$, Rice run-length encoding (with four possible exponents), explicit location encoding, and binary encoding. Further, whenever for some k there are no occurrences of a particular value $v_k$, an indicator of a zero vector, $z_k=0$, is encoded in the output bit stream. One possible indicator of a zero vector is shown in Table 2 below. When one of these coding techniques is selected for encoding a coding vector $s_k$, an indicator of the selected coding technique is inserted in the output bit stream prior to the encoding bits of the coding vector $s_k$. One set of possible indicators for the coding techniques is shown in Table 2 below.

TABLE 2

| Encoding | Bit stream sequence |
|---|---|
| Binary encoding | 000 |
| Run length Rice encoding (S = 1) | 001 |
| Run length Rice encoding (S = 2) | 010 |
| Run length Rice encoding (S = 3) | 011 |
| Run length Rice encoding (S = 4) | 100 |
| Value not occurring | 101 |
| Unused | 110 |
| Explicit location encoding | 111 |

In some embodiments of the invention, if the number of bits needed to run-length encode the locations of $v_k$ in a coding vector $s_k$ is greater than $D_k$, then binary encoding is used. Specifically, $D_k$ bits are written into the output bit stream, where binary 1's and 0's are written when $s_k(n)=v_k$ and $s_k(n) \neq v_k$, respectively, with $n=0, \ldots, D_k-1$.

In some embodiments of the invention, Rice run length encoding is used to encode the locations of $v_k$ in a coding vector $s_k$ if the number of bits required to encode the segment lengths between the occurrences of $v_k$ within the $s_k(n)$ sequence (which in essence defines the locations of all occurrences of values $v_k$ provides the best compression. Rice parameters over the range of one to four are tried, and the one that provides the best compression is selected. If Rice run length coding provides the best compression, then the coding vector $s_k$ is run length encoded in the output bit stream.

In some embodiments of the invention, if binary encoding is not used and $1 \leq N_k \leq 4$ and the number of bits needed to run-length encode the locations of $v_k$ a coding vector $s_k$ is greater than $N_k \lceil \log_2(D_k) \rceil + 2$, then explicit location encoding is used. The $N_k$ locations $l_k(m)$ of $v_k$ are determined such that $s_k(l_k(m))=v_k$, for $m=0, \ldots, N_k-1$. The binary value of $N_k-1$ is encoded in the output bit stream in two bits and then the $N_k$ indices $l_k(m)$ are written to the output bit stream with $\lceil \log_2(D_k) \rceil$ bits each.

Referring again to FIG. 2, the steps 200-210 are repeated (212) for each frame in the digital signal that is to be encoded using lossless value-location encoding. As is explained in more detail below in reference to FIG. 5, lossless value-location encoding may be used in combination with other methods for compressing digital signals. In such embodiments, the lossless value-location encoding may be selected for encoding some frames in the digital signal and other encoding methods may be used for other frames in the digital signal. Criteria for determining when lossless value-location encoding is used in preference to other coding methods may depend on the application. For example, lossless value-location encoding may be used whenever the number of possible distinct data values to encode, L, is within some desired range, or when the minimum and maximum values of a frame are within a desired range, or whenever else the signal is expected to be efficiently encoded by this method.

In some embodiments of the invention, lossless value-location encoding is selected according to criteria empirically determined by statistical analysis of relevant test signals. More specifically, lossless value-location encoding is used when $L \leq 4$ and the maximum and minimum data values are in one of four desired ranges. The frame length N is also considered for one of the four desired ranges. Table 3 below summarizes these selection criteria. If the data values in the frame meet one of the criteria in specified Table 3 and the most frequently occurring data value in the frame is 0, then lossless value-location encoding is used for the frame with the reference data value $v_0=0$. If lossless value-location encoding is used, an indicator of the specific criteria met is written into the output stream, i.e., one of the values in the column of Table 3 labeled "Bit stream sequence."

TABLE 3

| L | $I_{min}$ | $I_{max}$ | Frame length | Data-range case | Bit stream sequence |
|---|---|---|---|---|---|
| 4 | −2 | 1 | 240, 320 | 0 | 00 |
| 3 | −1 | 1 | All | 1 | 01 |
| 3 | −2 | 0 | All | 2 | 10 |
| 2 | 0 | 1 | All | 3 | 11 |

In the above method, the mapping of the possible distinct data values to the coding order $v_k$ impacts the achievable maximum compression of the N samples. Encoding a vector first that has a larger number of elements $N_k$ may require more bits to encode the locations of the $v_k$, but more elements may be removed in the generation of subsequent coding vectors. On the other hand, encoding a coding vector with a smaller number of elements before one with a larger number of elements may require fewer bits, but fewer elements may be removed in the generation of subsequent coding vectors.

Further, the value determined for the reference data value $v_0$ and/or the coding order $v_k$ affects the achievable maximum compression. For example, some choices of the reference data value $v_0$ and the coding order $v_k$ may required the explicit encoding of the reference data value and each of the $v_k$. If $B_v$ bits are required to encode one value, then $LB_v$ bits are needed to encode the $v_0$ and $v_k$ values. If the values in the frame are such that values are within some small offset of a particular value of $v_0$ and $B_o$ bits are required to specify this offset, with $B_o<B_v$, then the $v_0$ and the $v_k$ offsets may be encoded in $B_v+(L-1)B_o$ bits.

Encoding efficiency may be further improved if a known relationship between the $v_k$ values exists, so that mapping of the remaining possible data values to the $v_k$ may be done in a pre-determined order. For example, if the $v_0$ and $v_k$ values are mapped sequentially from the minimum to maximum data values, then $v_0$ may be encoded with all other $v_k$ being explicitly known. In general, it is desirable that the choice of the reference data value $v_0$ and the coding order $v_k$ is made such that when combined with encoding of the code vectors, maximum coding efficiency is achieved.

Figure 5:
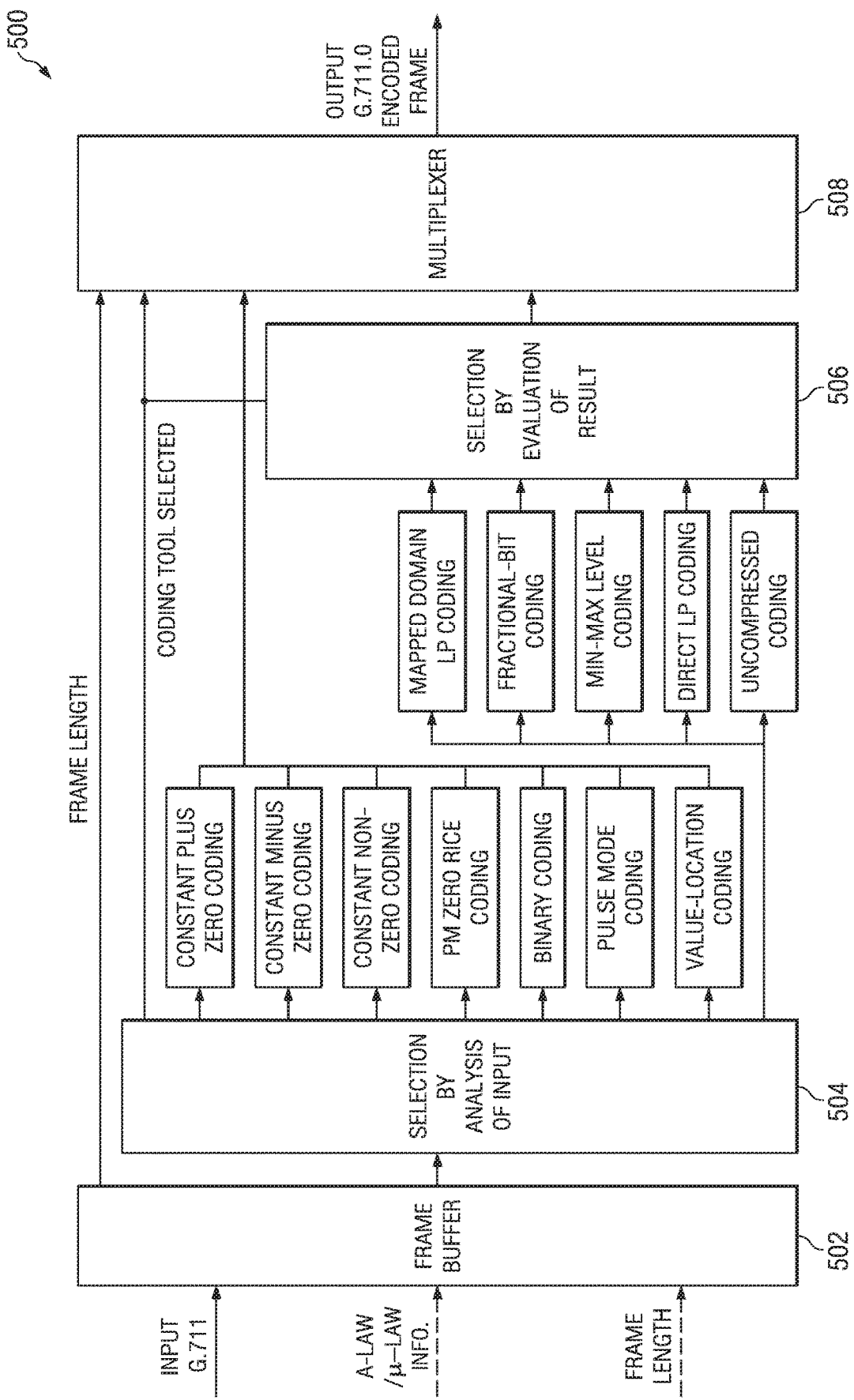
FIG. 5 shows a block diagram of an audio encoder in accordance with one or more embodiments of the invention.

FIG. 5 shows a block diagram of an audio encoder (500), e.g., the audio encoder (106) of FIG. 1, configured to perform lossless value-location encoding in accordance with one or more embodiments of the invention. More specifically, FIG. 5 shows a high level block diagram of the ITU-T G.711.0 audio encoder for illustrative purposes. The audio encoder (500) includes a frame buffer (502), two coding tool selection components (504, 506), twelve coding tools, and a multiplexer (508). The audio encoder (500) receives G.711 audio frames in the frame buffer (502). The frame size N may be 40, 80, 160, 240, or 320 samples. Each frame is then provided to input selection component (504).

The input selection component (504) may select one of seven encoding tools, i.e., the three constant coding tools, the PM zero Rice coding tool, the binary coding tool, the pulse mode coding tool, and the value-location coding tool, to which it is connected for encoding the frame based on an analysis of the audio frame and/or determine that the frame should be encoded by one of the five other coding tools, i.e., the mapped domain LP coding tool, the fractional-bit coding tool, the min-max level coding tool, the direct LP coding tool, and the uncompressed coding tool. The outputs of the latter five coding tools are provided to output selection component (506) which selects the best output of the five coding tools by analyzing the results of the coding tools. The output selection component (506) may not require a complete encoding by each of the five coding tools, but rather may estimate the resulting encoded frame sizes and select one of the coding tools for performing the actual encoding based on the estimates. The multiplexer (508) selects which coding tool bit stream to output: the bit stream of the coding tool selected by the input selection component (504) or the bit stream of the coding tool selected by the output selection component (506).

The coding techniques provided by each of the coding tools are described in ITU-T G.711.0. Further, the fractional-bit coding tool may provide a coding technique as described in co-pending U.S. patent application Ser. No. 12/818,164, entitled "Method and System for Block Adaptive Fractional-Bit Per Sample Encoding, filed on Jun. 18, 2010, which is incorporated by reference herein in its entirety. The coding technique described in ITU-T G.711.0 for the value-location coding tool is an embodiment of the method for lossless value-location encoding of FIG. 2. In the described embodiment, the value-location coding tool is selected according to the criteria shown in Table 3 above and when the most frequently occurring data value in a frame is 0. When selected, the value-location coding tool assumes that the reference data value $v_0$ is 0 and determines the coding order $v_k$ using the previously describing alternating technique. Further, the N samples in the frame are decomposed into coding vectors $s_k$ as previously described, and are selectively encoded using one of Rice run-length encoding, explicit location encoding, or binary encoding as previously described.

In one or more embodiments of the invention, the value-location coding tool may provide coding functionality in accordance with one or more other embodiments of the method of FIG. 2. For example, interim coding vectors $c_k$ may be computed and then reduced in length to generate reduced-length coding vectors $z_k$. Further, different techniques may be used to determine the reference data value $v_0$ and/or the coding order $v_k$.

Embodiments of the methods and encoders described herein may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). Any included software may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Figure 6:
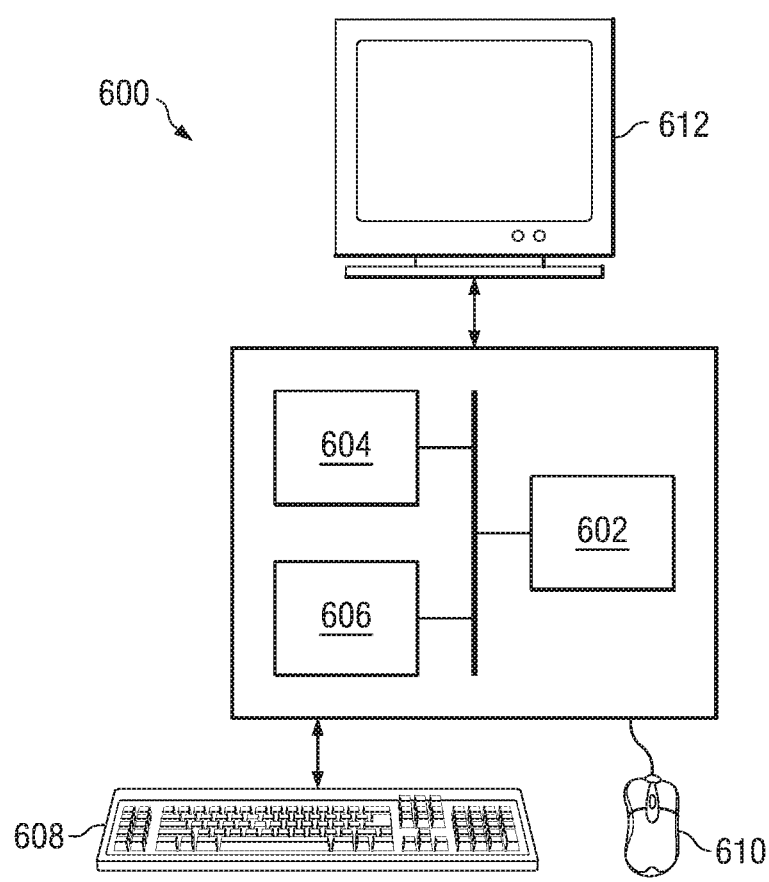
FIG. 6 shows an illustrative digital system in accordance with one or more embodiments of the invention.

Embodiments of the methods and encoders for lossless value-location encoding as described herein may be implemented for virtually any type of digital system (e.g., a desk top computer, a laptop computer, a handheld device such as a mobile (i.e., cellular) phone, a personal digital assistant, a Voice over Internet Protocol (VOIP) communication device such as a telephone, server or personal computer, etc.) with functionality to capture or otherwise generate digital signals. FIG. 6 shows a block diagram of an illustrative digital system (600) (e.g., a personal computer) that includes a processor (602), associated memory (604), a storage device (606), and numerous other elements and functionalities typical of digital systems (not shown). In one or more embodiments of the invention, the digital system (600) may include multiple processors and/or one or more of the processors may be digital signal processors.

The digital system (600) may also include input means, such as a keyboard (608) and a mouse (610) (or other cursor control device), and output means, such as a monitor (612) (or other display device). The digital system (600) may also include an audio capture device (not shown) that includes circuitry (e.g., a microphone) for capturing audio sequences. The digital system (600) may include an audio encoder, e.g., the encoder of FIG. 5, with functionality to perform embodiments of the method of FIG. 2 as described herein. The digital system (600) may be connected to a network (not shown) (e.g., a local area network (LAN), a wide area network (WAN) such as the Internet, a cellular network, any other similar type of network and/or any combination thereof) via a network interface connection (not shown). Those skilled in the art will appreciate that the input and output means may take other forms.

Further, those skilled in the art will appreciate that one or more elements of the aforementioned digital system (600) may be located at a remote location and connected to the other elements over a network. Further, embodiments of the invention may be implemented on a distributed system having a plurality of nodes, where each portion of the system and software instructions may be located on a different node within the distributed system. In one embodiment of the invention, the node may be a digital system. Alternatively, the node may be a processor with associated physical memory. The node may alternatively be a processor with shared memory and/or resources.

Software instructions to perform embodiments of the invention may be stored on a computer readable medium such as a compact disc (CD), a diskette, a tape, a file, memory, or any other computer readable storage device. The software instructions may be distributed to the digital system (600) via removable computer readable media (e.g., floppy disk, optical disk, flash memory, USB key), via a transmission path from computer readable media on another digital system, etc.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims. It is therefore contemplated that the appended claims will cover any such modifications of the embodiments as fall within the true scope and spirit of the invention.

What is claimed is:

1. A method comprising:
receiving a digital audio signal that includes a frame containing a set of samples, wherein each sample in the set of samples has a value within a range and a location in a first sequence;
determining a set of values within the range, wherein each value in the set of values has a corresponding sample in the set of samples;
decomposing the set of samples into a set of vectors, wherein:
each vector of the set of vectors corresponds to a respective value within the set of values and contains a representation of each occurrence of the respective value;
the set of vectors includes a first vector associated with a first value and a second vector associated with a second value;
the set of vectors has a second sequence such that the first vector is first in the second sequence and the second vector is subsequent to the first vector;
the first vector includes an element for each location in the first sequence that indicates whether the set of samples includes a sample with the first value at the respective location; and
the second vector includes an element for each location in a subset of locations that indicates whether the set of samples includes a sample with the second value at the respective location, wherein the subset of locations excludes each location at which the first value occurs; and
providing an output bit stream that includes the set of vectors.

2. The method of claim 1 further comprising performing a compression operation on the set of vectors to produce a compressed set of vectors such that the output bit stream includes the compressed set of vectors.

3. The method of claim 2, wherein the compression operation is from a group consisting of: Rice encoding, explicit location coding, and binary encoding.

4. The method of claim 2 further comprising providing an indicator of the compression operation in the output bit stream.

5. The method of claim 1 further comprising:
determining a reference value within the set of values; and
determining the second sequence such that the first vector is first in the second sequence based on the first vector being associated with the reference value.

6. The method of claim 5, wherein the determining of the reference value determines the reference value based on a frequency of occurrence.

7. The method of claim 5, wherein the second sequence of the set of vectors is determined based on a count of values of the set of values that are greater than the reference value and a count of values of the set of values that are less than the reference value.

8. The method of claim 1, wherein the second sequence of the set of vectors is based on a frequency of occurrence.

9. The method of claim 1 further comprising:
determining a first compression operation to perform on the first vector;
performing the first compression operation on the first vector, wherein the output bit stream includes the first vector having the first compression operation performed thereupon;
determining a second compression operation to perform on the second vector, wherein the second compression operation is different from the first compression operation; and performing the second compression operation on the second vector, wherein the output bit stream includes the first vector having the second compression operation performed thereupon.

10. The method of claim 1, wherein:
the subset of locations of the second vector is a first subset of locations;
the set of vectors includes a third vector associated with a third value;
the third vector is subsequent to the second vector in the second sequence; and
the third vector includes an element for each location in a second subset of locations that indicates whether the set of samples includes a sample with the third value at the respective location, wherein the second subset of locations excludes each location at which the first value or the second value occurs.

11. An encoder comprising:
a frame buffer that includes an input to receive a frame that includes a set of samples and an output to provide the set of samples;
a selection circuit that includes an input coupled to the output of the frame buffer to receive the set of samples and a set of outputs to provide the set of samples at a selected subset of the set of outputs;
a set of coding units that each include an input coupled to an output of the set of outputs of the selection circuit to receive the set of samples and further include an output;
a multiplexer coupled to the outputs of the set of coding units and including an output to provide an encoded frame based on the output of at least one of the set of coding units,
wherein the set of coding units includes a value-location coding unit configured to:
receive the set of samples from the selection circuit, wherein each sample of the set of samples has a respective value within a set of values and a location in a location sequence;
decompose the set of samples into a set of vectors, wherein:
each vector is associated with a respective value of the set of values;
the set of vectors includes a first vector that includes an element for each location in the location sequence that specifies whether a first value of the set of values occurs at the respective location;
the set of vectors includes a second vector that is subsequent to the first vector and includes an element for each location in a subset of the location sequence that specifies whether a second value of the set of values occurs at the respective location; and
the subset of the location sequence excludes each location of the set of locations at which the first value occurs; and
provide the set of vectors at the output to the multiplexer such that the encoded frame includes the set of vectors.

12. The encoder of claim 11, wherein:
wherein the set of vectors is arranged in a sequence; and
the value-location coding unit is further configured to provide an indicator of the sequence to the multiplexer such that the encoded frame includes the indicator of the sequence.

13. The encoder of claim 11, wherein the value-location coding unit is further configured to:
perform a compression operation on the set of vectors to produce a compressed set of vectors; and
provide the compressed set of vectors to the multiplexer such that the encoded frame includes the compressed set of vectors.

14. The encoder of claim 11 further comprising an output selection component coupled between a subset of the set of coding units and the multiplexer, wherein the output selection component is configured to select the output of a first coding unit of the subset of the set of coding units to provide to the multiplexer.

15. A method comprising:
receiving an audio signal that includes a set of samples, wherein each sample of the set of samples has a value within a set of values and a location in a location sequence;
decomposing the set of samples into a set of vectors, wherein:
each vector of the set of vectors corresponds to a respective value in the set of values and contains an indication of each occurrence of the respective value in the set of samples;
the set of vectors includes a first vector associated with a first value and a second vector associated with a second value;
the set of vectors is arranged in a vector sequence;
the first vector includes an element for each location in the location sequence that indicates whether the set of samples includes a sample with the first value at the respective location; and
the second vector includes an element for each location in a subset of locations that indicates whether the set of samples includes a sample with the second value at the respective location, wherein the subset of locations excludes each location at which the first value occurs based on the second vector being subsequent to the first vector in the vector sequence; and
providing the set of vectors in an output bit stream.

16. The method of claim 15, further comprising applying compression to the set of vectors to produce a compressed set of vectors, wherein the providing of the set of vectors in the output bit stream provides the compressed set of vectors in the output bit stream.

17. The method of claim 15 further comprising providing an indication of the vector sequence in the output bit stream.

18. The method of claim 15 further comprising selecting a reference value of the set of values, wherein the first vector corresponds to the reference value.

19. The method of claim 15 further comprising determining the vector sequence based on a number of occurrences of each value of the set of values.

20. The method of claim 19, wherein the determining of the vector sequence includes:
determining a reference value of the set of values having a greatest number of occurrences in the set of samples;
determining a first count of occurrences of values greater than the reference value in the set of samples;
determining a second count of occurrences of values less than the reference value in the set of samples; and
determining the vector sequence based on the reference value, the first count, and the second count.

* * * * *